US009739494B2

(12) United States Patent
Nutter et al.

(10) Patent No.: US 9,739,494 B2
(45) Date of Patent: Aug. 22, 2017

(54) HUMIDIFYING DEVICE WITH A PROJECTION MECHANISM

(75) Inventors: Francis C. Nutter, Charlton, MA (US); Lara Peterson, Mendon, MA (US)

(73) Assignee: Helen of Troy Limited, Belleville, St. Michael (BB)

( * ) Notice: Subject to any disclaimer, the term of this patent is extended or adjusted under 35 U.S.C. 154(b) by 0 days.

(21) Appl. No.: 13/269,024

(22) Filed: Oct. 7, 2011

(65) Prior Publication Data
US 2012/0154760 A1 Jun. 21, 2012

Related U.S. Application Data

(60) Provisional application No. 61/390,757, filed on Oct. 7, 2010.

(51) Int. Cl.
| | | |
|---|---|---|
| *G03B 21/56* | (2006.01) | |
| *F24F 6/00* | (2006.01) | |
| *G03B 29/00* | (2006.01) | |
| *F24F 6/12* | (2006.01) | |
| *G03B 21/00* | (2006.01) | |

(52) U.S. Cl.
CPC ............... *F24F 6/00* (2013.01); *G03B 29/00* (2013.01); *F24F 2006/008* (2013.01); *F24F 2006/125* (2012.12); *F24F 2221/02* (2013.01); *G03B 21/00* (2013.01); *Y02B 30/80* (2013.01)

(58) Field of Classification Search
CPC .......... G03B 21/56; G03B 21/00; G03B 1/14; A64G 9/00
USPC ....................... 353/28, 62, 122; 359/443, 460
See application file for complete search history.

(56) References Cited

U.S. PATENT DOCUMENTS

| | | | |
|---|---|---|---|
| 2,888,205 A | 5/1993 | Trucco | |
| 5,213,595 A | 5/1993 | Kim | |
| 6,301,433 B1 * | 10/2001 | Montagnino et al. ........ | 392/405 |
| 6,857,746 B2 * | 2/2005 | Dyner ............................. | 353/28 |
| 7,147,345 B1 * | 12/2006 | Toney, Jr. ...................... | 362/208 |
| 7,727,078 B2 * | 6/2010 | Arnold et al. ................. | 472/118 |
| 2006/0221594 A1 * | 10/2006 | Thuot Rann et al. .......... | 362/96 |

(Continued)

FOREIGN PATENT DOCUMENTS

| | | | | |
|---|---|---|---|---|
| JP | 406237849 A | * | 8/1944 | .......................... 19/2 |
| JP | A-H08-094132 | | 4/1996 | |

(Continued)

*Primary Examiner* — Steven H Whitesell Gordon
*Assistant Examiner* — Jerry Brooks
(74) *Attorney, Agent, or Firm* — Rankin, Hill & Clark LLP

(57) ABSTRACT

A humidifier has a housing that holds humidifying equipment and an image projector. The image projector is set on the top portion of the housing and includes a light source, a removable projector cover and a projector lens. Light from the light source shines through the projector lens and projector cover to project an image onto a surface of the room, such a ceiling. The humidifying equipment may be conventional in nature, including for example a fan, a water tank, a water reservoir, a filter, a filter tray or combinations thereof. The image projector may also include a rotating mechanism that causes the projected image or images to rotate. The light source may also provide different colors of light. One or more optical characteristics of the projected image, such as image size, shape, color and brightness can be changed by changing the projector lens, projector cover or both.

30 Claims, 3 Drawing Sheets

(56) References Cited

U.S. PATENT DOCUMENTS

| | | | |
|---|---|---|---|
| 2007/0012718 A1* | 1/2007 | Schramm et al. | 222/23 |
| 2007/0034082 A1* | 2/2007 | Adair et al. | 96/63 |
| 2007/0242225 A1 | 10/2007 | Bragg et al. | |
| 2008/0315006 A1* | 12/2008 | Belongia et al. | 239/44 |
| 2009/0016054 A1* | 1/2009 | Chien | 362/250 |
| 2009/0252656 A1 | 10/2009 | Hou | |
| 2010/0031543 A1 | 2/2010 | Rice et al. | |

FOREIGN PATENT DOCUMENTS

| | | |
|---|---|---|
| JP | 3089863 | 8/2002 |
| JP | A-2008-123923 | 5/2008 |
| JP | 3155997 | 11/2009 |
| JP | 3157629 | 2/2010 |

* cited by examiner

HUMIDIFYING DEVICE WITH A PROJECTION MECHANISM

CROSS-REFERENCE TO RELATED APPLICATIONS

This application claims the benefit under 35 U.S.C. §119(e) of U.S. Provisional Application No. 61/390,757, filed on Oct. 7, 2010, the contents of which are incorporated herein by reference.

BACKGROUND OF THE INVENTION

1. Field of the Invention

The present invention relates to air handling devices, and more specifically, to a humidifier that has a projection mechanism for projecting images onto a surface, such as a ceiling.

2. Description of the Related Art

Humidifying devices or humidifiers are air handling devices used to provide moisture to ambient air in a room. Typically humidifiers are used in a single room in a home and may be used when a person in the room requires additional moisture either for medical or comfort-related reasons. One particular use of humidifiers is in a child or infant's room where the humidifier provides additional moisture that can be helpful and therapeutic to a child who may have a cold or other sinus related issues, or in a manner to prevent such issues from arising. Over the past few years as humidifiers have become more popular around households, they have undergone various design changes in order to be both pleasant to the user and accomplish the purpose of providing adequate moisture to the air.

One negative aspect of humidifiers has been the amount of noise that such humidifiers generate when their internal fan is activated to release the air/moisture mix from the humidifier into the room. This negative aspect to the humidifier is particularly acute when the humidifier is placed in a child or infant's room such that the child may be easily frightened. This is especially the case when the child or infant may be suffering from an illness that was the reason the humidifier was placed in the room in the first place.

Therefore, a need exists for a humidifier that is able to soothe a child, provide distracting features or both so that the child or adult is not frightened or bothered by the humidifier.

It should be noted that although the below description describes the device of the present invention as being a humidifier, it can be appreciated by one of ordinary skill in the art that certain aspects of the present invention can be used in conjunction with other air handling devices, such as an air purifier, fan or heater, for example, or any type of humidifier including, but not limited to, ultrasonic humidifiers.

SUMMARY OF THE INVENTION

In view of the above discussion and the shortcomings in the prior art, the invention seeks to overcome such shortcomings of the prior art by providing an air handling device, such as a humidifier, that provides all of the benefits of a typical air handling device and which also contains an image projector that can project one or more images from the air handling device.

According to one embodiment of the present invention a humidifier has a housing that holds humidifying equipment and to which is coupled an image projector. In a preferred embodiment the image projector is in the form of a projector segment disposed on the top portion of the housing that includes a light source, a removable projector cover and a removable projector lens. In practice, in conjunction with or separate from the operation of the humidifier, when the light source is illuminated, it causes light to shine through the projector lens and projector cover to project an image onto a surface of the room, such as a ceiling. The humidifying equipment can include any known elements that a humidifier may contain, including but not limited to, a fan, a water tank, a water reservoir, a filter and a filter tray. The image projector may also include a rotating mechanism that causes the projected images to rotate. In another embodiment the light source can provide different colors of light. In preferred embodiments one or more optical characteristics of the projected image, such as image size, shape, color and brightness can be changed by changing the projector lens, projector cover or both.

BRIEF DESCRIPTION OF THE DRAWINGS

Certain embodiments of the present invention will be better understood when read in conjunction with the appended drawings wherein like reference numerals refer to like components. For the purposes of illustrating the device of the present application, there is shown in the drawings preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but merely to clarify a single illustrated embodiment of the invention. In the drawings.

DETAILED DESCRIPTION OF THE PREFERRED EMBODIMENTS

Figure 1:
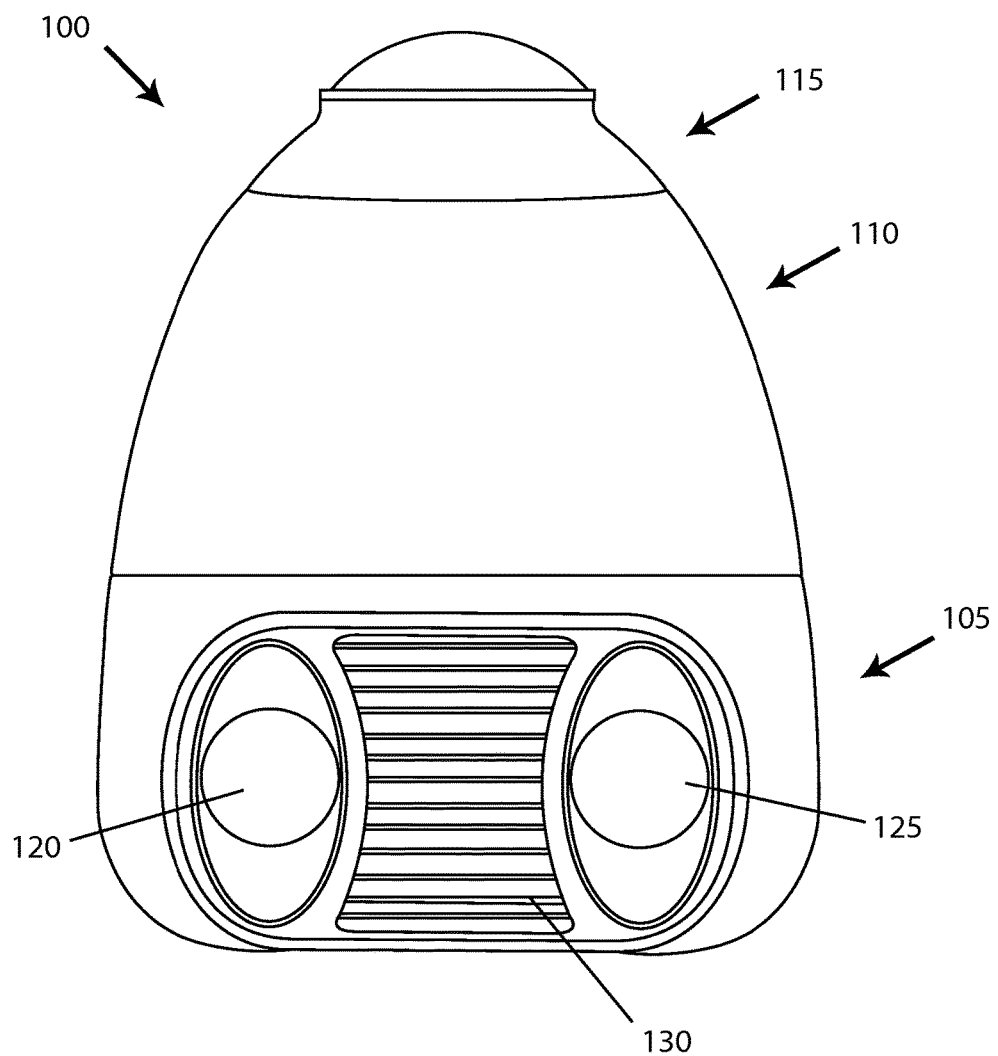
FIG. 1 is a front view of a humidifier according to one embodiment of the present invention.

As can be seen in FIG. 1, an embodiment humidifier 100 has a housing that is preferably defined by a lower portion 105 and an upper portion 110. Upper portion 110 preferably has at its topmost portion a projector segment 115. Projector segment 115 provides an image projector that can include a light source, such as a light bulb, halogen lamp, LED or the like, and an image-generating optical element, such as a lens; projector segment 115 may also include a projector cover, as will be discussed in more detail below. Lower portion 105 preferably contains humidifying equipment, of any suitable type as known in the art, and a related humidifier control 120, such as a knob, a button or the like, to control the operation of the humidifying equipment. Lower portion 105 can also include a projector control 125, which again may be a knob, button or the like, to control the operation of the projector segment 115. It will be appreciated by one of ordinary skill in the art that humidifier control 120 and projector control 125 may be combined into a single control. Thus, in various embodiments, the operation of the humidifying equipment and attendant projector segment 115 may be co-dependent (e.g., the projector segment 115 is turned on only when the humidifying equipment is on) completely independent (e.g., the projector segment 115 can operate when the humidifying equipment is off) or some combination thereof. Alternatively, as indicated above, it will be appreciated by one of ordinary skill in the art that buttons or other actuation functionality may be incorporated in lieu of knobs in order to operate the humidifier and/or projector mechanisms. Lower portion 105 also preferably contains air vents 130 where humidified air or a mist is released from humidifier 100 into the ambient air.

Figure 2:
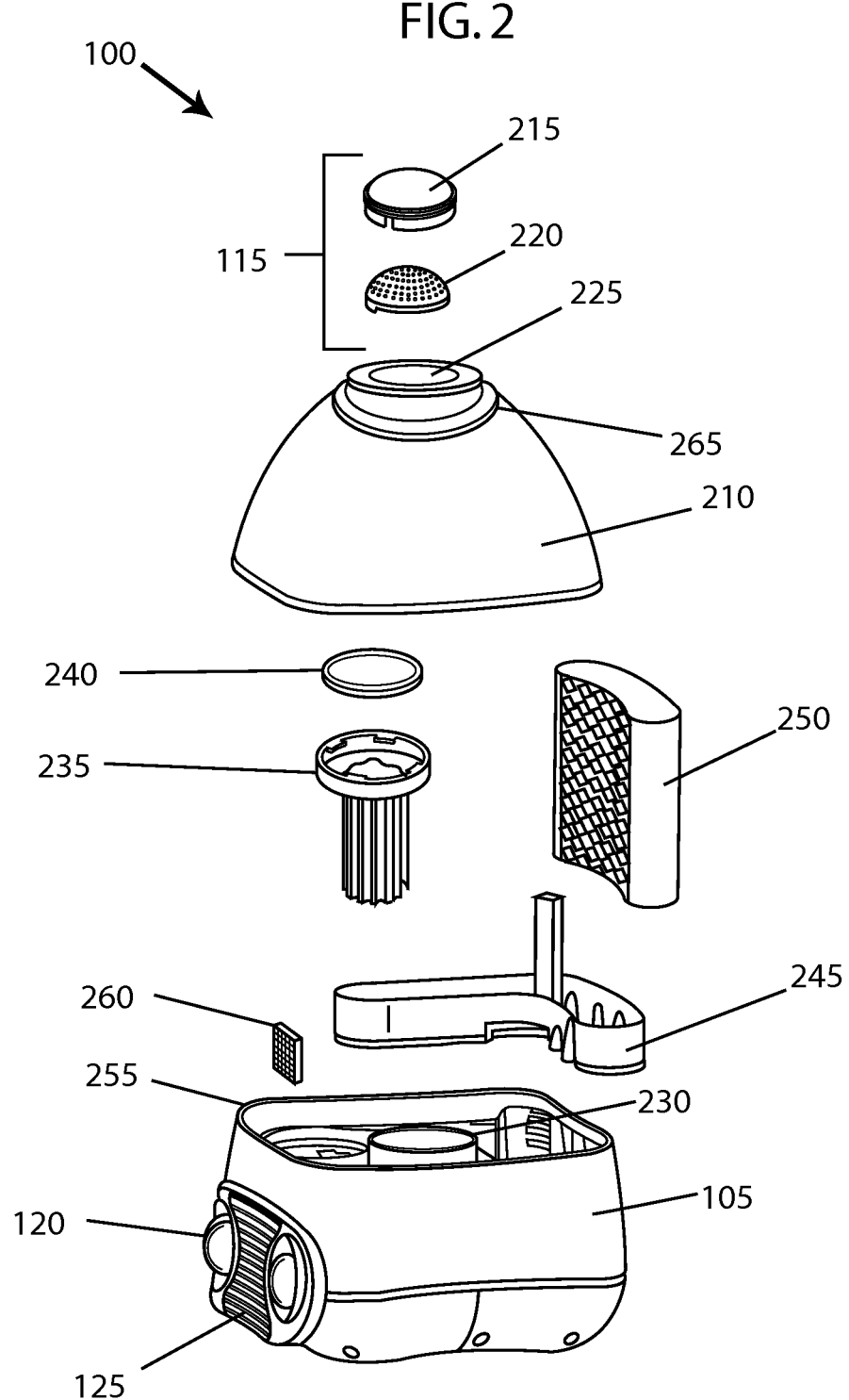
FIG. 2 is an exploded view of a humidifier according to one embodiment of the present invention.
Figure 3:
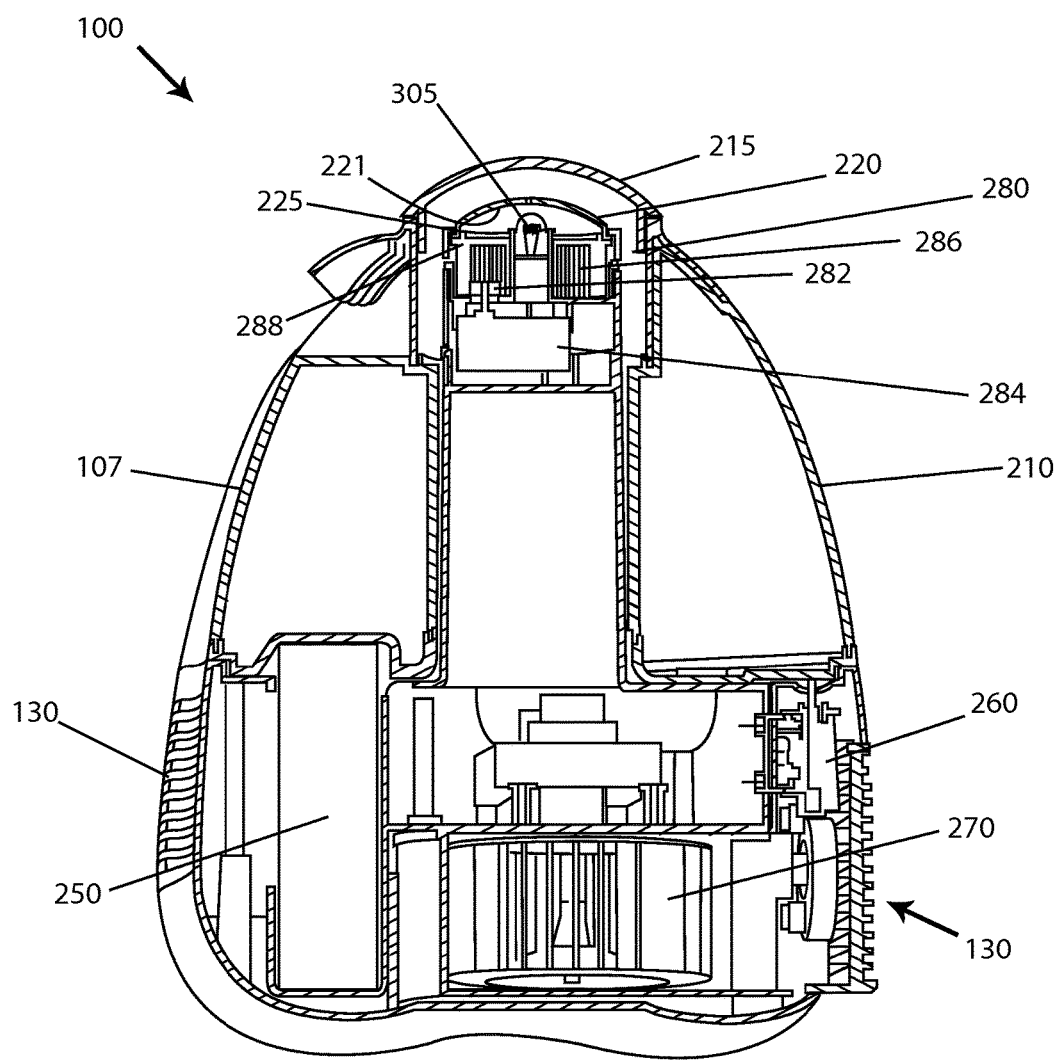
FIG. 3 is a perspective cut away view of a humidifier according to one embodiment of the present invention.

With further reference to FIGS. 2 and 3, upper portion 110 preferably includes a water tank 210 and projector segment 115. Projector segment 115 preferably contains a projector cover 215, a projector lens 220 and a light source 305. In practice, projector lens 220 is placed into an aperture 225 located at the distal, or upper, end of upper portion 110 and the projector lens 220 is then covered by projector cover 215. In preferred embodiments both the lens cover 215 and the lens 220 itself are removable by the user so as to be replaceable, as set forth below. Projector lens 220 preferably has designs on it, such as by way of a film 221 or the like, that can be illuminated and projected onto an external surface (e.g., a wall or ceiling) when the light source 305 is activated. Of course, the images may be projected onto any suitable surface or material. In one embodiment these designs may be a picture or drawing (e.g., the moon and stars) that would sooth a child or infant. Moreover, the light source 305 can be a multicolor light source or a source that changes colors periodically so that the projection can change colors at a set interval or periodically. Alternatively the light source 305 may provide a single color of light. Once projector segment 115 is assembled and the projector control 125 is actuated, the light source 305 illuminates projector lens 220, which projects an image that is on projector lens 220 through the cover 215 and onto the ceiling or other surface of the room. In one preferred embodiment, humidifier 100 is designed to project an image from a 24-48 inch high surface upwards to a flat, standard height ceiling (i.e., an 8 foot ceiling), and the optics of lens 220 and cover 215 are designed accordingly.

In one embodiment, humidifier 100 may include multiple interchangeable projector lenses 220, projector covers 215 or both to change one or more optical characteristics of the projected image, such as the type, size or both of the image being projected, the color or tint of the projected image, the brightness of the projected image, or combinations thereof. For example, each projector lens 220 may contain a different design or be a different color so that a user can select a lens 220 to change the design or color being projected. Similarly, each projector cover 215 may be of a different thickness, color or optical density so that the user can adjust the brightness, dimness or color of the images being projected. Any suitable mechanical arrangement between the lens 220, cover 215 and upper portion 110 may be utilized to provide such interchangeability of lenses 220 and covers 215. It will be appreciated that although in the present embodiment, the projector segment 115 is described as being on the top of the humidifier 100, one with ordinary skill in the art will appreciate that the projector 115 can be placed on other portions of the humidifier 100 without departing from the spirit of the invention. For example, the projector 115 may be disposed on a sidewall 107 of the housing so as to project images onto a wall or other vertical surface. A handle 265 may also be included as part of upper portion 110 to allow the humidifier 100 to be easily transported. It will be further appreciated that cover 215 may also have optical focusing properties in addition to those of lens 220.

In one embodiment, a rotating mechanism 280 may also be part of the projector segment 115 so that projector lens 220 and the images projected through projector lens 220 can rotate and be more pleasing to the eye. Any suitable mechanism may be used to rotate the lens 220, the light source 305, the cover 215 or combinations thereof. For example, if the light source 305 is a multicolor light source formed from two or more different single-color sources of light, the light source 305 may be rotated by the rotating mechanism in addition to the lens 220, while cover 215 may remain fixed to upper portion 110. In a preferred embodiment, the images rotate at a speed of approximately 1 RPM about a point located at the center of the projected image. By way of example, a pinion 282 may be driven by a motor 284 that in turn drives a wheel gear 286 coupled to a rotatable fixture 288 holding lens 220. Of course, other arrangements are also possible, such as instead coupling the pinion 282 via a gear reduction mechanism or the like to the axle that drives fan 270. It may also be possible to have multiple modes for humidifier 100 (e.g., one in which the images rotate and one in which the images are stationary) or allow the user to control the speed of rotation of the image, such as by controlling the speed of motor 284. The projector cover 215 is preferably made of a polyurethane or plastic material. In a preferred embodiment, the optics of projector segment 115, including light source 305, lens 220 and lens cover 215 are such that the angular extents of the projected image or images are between 110 and 130 degrees relative to aperture 225. Any suitable optical configuration may be employed to obtain these angular extents.

The proximal, or lower, end of upper portion 110 preferably fits into the open top of lower portion 105. In practice, water tank 210 is filled by a user and mated with the water reservoir 230 that is part of lower portion 105. In one embodiment, water tank 210 may also contain a tank cap 235 and tank cap gasket 240 to control the flow of water into and out of the water tank 210. Once a user has filled the water tank 210 with water, the tank cap 235 in conjunction with the tank cap gasket 240 allow the water to flow from the water tank 210 into the water reservoir 230 without spilling. As can be seen in FIGS. 2 and 3, lower portion 105 may also include a removable filter tray 245 which is configured to hold a filter 250. In certain embodiments, lower portion 105 may also have a slot 255 that is configured to receive a scent pad 260 that is designed to interact with the moisture generated by the humidifier 100 and create a pleasing smell in the environment around the humidifier 100. In practice, once the water tank 210 has been filled and the upper portion 110 and lower portion 105 have been coupled, a user can actuate the humidifier control 120 to activate a fan 270 to begin the humidifying process. Humidifier control 120 may also have different speeds for adjusting the speed of the fan 270. As one with ordinary skill in the art will appreciate, once the fan 270 is turned on, filter 250, which absorbs water from water reservoir 230, provides an increased evaporative surface area. The fan 270 is preferably adjacent to the filter 250 to aid in the evaporation of the water, which is then emitted through air vents 130. A user can also separately actuate projector control 125 to allow the humidifying equipment to operate at the same time that an image is being projected from the projector segment 115. In certain embodiments, humidifier 100 can be designed so that if water tank 210 is removed from the lower portion 105, the light source 305 automatically shuts off and the projection ceases.

One having ordinary skill in the art will recognize that the various mechanisms described for the preferred embodiments of the humidifier 100 may be adapted and interchanged between the preferred embodiments, without significantly impacting the structure and operation of the humidifier 100. Those skilled in the art will recognize that the present invention has many applications, may be implemented in many manners and, as such is not to be limited by the foregoing embodiments and examples. Any number of the features of the different embodiments described herein may be combined into one single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as set forth in the following claims. While there had been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known and future developed variations and modifications to the components described herein as would be understood by those skilled in the art.

What is claimed is:

1. A humidifier comprising:
   a housing comprising air vents;
   humidifying equipment, including a water tank, disposed within the housing to provide humidified air to appreciably increase net moisture content of ambient air within a room;
   the air vents disposed on a first side of the housing and configured to release humidified air generated by the humidifying equipment into the room; and
   an image projector coupled to a second side of the housing and configured to project an image onto a surface of the room, wherein the second side of the housing faces a direction different from that of the first side of the housing so that the projected image does not pass through the released humidified air exiting the air vents.

2. The humidifier of claim 1 wherein the image projector comprises a light source, and at least one of a lens and a cover, wherein the at least one of the lens and the cover is replaceable to change an optical characteristic of the image projector.

3. The humidifier of claim 2 wherein the image projector comprises an image near the lens that the image projector projects by way of the lens.

4. The humidifier of claim 3 wherein the image is in the form of a film disposed on the lens.

5. The humidifier of claim 2 wherein the at least one of the lens and the cover is tinted or colored to change a tint or color of the image projected by the image projector.

6. The humidifier of claim 2 wherein the light source is configured to provide multi-colored light.

7. The humidifier of claim 2 further comprising a rotating mechanism to rotate the at least one of the lens and the cover.

8. The humidifier of claim 1 wherein the image projector is disposed at an upper portion of the housing.

9. The humidifier of claim 1 further comprising a control to control respective on and off states of the humidifying equipment and the image projector.

10. The humidifier of claim 9 wherein the control comprises a humidifier control to control the on and off state of at least the humidifying equipment and a projector control to control the on and off state of the image projector when the humidifying equipment is in the on state.

11. The humidifier of claim 9 wherein the control comprises a humidifier control to control the on and off state of the humidifying equipment and a projector control to control the on and off state of the image projector independently of the on and off state of the humidifying equipment.

12. The humidifier of claim 1 wherein the image projector is disposed on a sidewall of the housing.

13. An air handling device comprising:
    a housing comprising air vents;
    air handling equipment comprising at least a fan and humidifying equipment, including a water tank, disposed within the housing to process ambient air of a room and appreciably increase net moisture content of ambient air within the room;
    the air vents disposed on a side of the housing and configured to release humidified air generated by the humidifying equipment into the room; and
    an image projector connected to a top of the housing, the image projector comprising a light source and a lens for projecting a visible image onto a surface in the room, wherein the projected visible image does not pass through the released humidified air exiting the air vents.

14. The air handling device of claim 13 wherein the image projector further comprises a cover, and at least one of the lens and the cover is replaceable to change an optical characteristic of the image projector.

15. The air handling device of claim 14 wherein a film comprising an image is disposed on the lens.

16. The air handling device of claim 14 wherein the at least one of the lens and the cover is tinted or colored to change a tint or color of an image projected by the image projector.

17. The air handling device of claim 14 further comprising a rotating mechanism to rotate the at least one of the lens and the cover.

18. The air handling device of claim 13 wherein the air handling equipment further comprises an air purifier.

19. The air handling device of claim 13 wherein the air handling equipment further comprises a heater.

20. The air handling device of claim 13 wherein the air handling device further comprises an air handling control configured to allow a user to control an on and off state of at least the air handling equipment and a projector control configured to allow a user to control an on and off state of the image projector when the air handling equipment is in the on state.

21. The air handling device of claim 13 wherein the air handling device further comprises an air handling control configured to allow a user to control an on and off state of the air handling equipment and a projector control configured to allow a user to control an on and off state of the image projector independently of the on and off state of the air handling equipment.

22. An air handling device comprising:
    a housing comprising air vents disposed on a first side of the housing;
    air handling equipment comprising at least a fan disposed within the housing to process ambient air of a room;

humidifying equipment, including a water tank, configured to generate humidified air and appreciably increase net moisture content of ambient air within the room, wherein the humidified air is released into the room through the air vents;

an image projector coupled to a second side of the housing and configured to project a visible image onto a surface of the room, wherein the second side of the housing faces a direction different from that of the first side of the housing so that the projected visible image does not pass through the released humidified air exiting the air vents;

an air handling control configured to allow a user to control an on and off state of at least the air handling equipment; and a projector control configured to allow a user to control an on and off state of the image projector at least when the air handling equipment is in the on state.

23. The air handling device of claim 22 wherein the projector control is configured to allow the user to control the on and off state of the image projector only when the air handling equipment is in the on state.

24. The air handling device of claim 22 wherein the projector control is configured to allow the user to control the on and off state of the image projector independently of the on and off state of the air handling equipment.

25. The air handling device of claim 22 wherein the image projector comprises a light source, and at least one of a lens and a cover, and the at least one of the lens and the cover is replaceable to change an optical characteristic of the image projector.

26. The air handling device of claim 25 wherein a film comprising an image is disposed on the lens.

27. The air handling device of claim 25 wherein the at least one of the lens and the cover is tinted or colored to change a tint or color of an image projected by the image projector.

28. The air handling device of claim 25 further comprising a rotating mechanism to rotate at least one of the lens and the cover.

29. The air handling device of claim 22 wherein the air handling equipment further comprises an air purifier.

30. The air handling device of claim 22 wherein the air handling equipment further comprises a heater.

* * * * *